(12) United States Patent
Chen et al.

(10) Patent No.: US 9,285,497 B2
(45) Date of Patent: Mar. 15, 2016

(54) POROSITY ESTIMATOR FOR FORMATE BRINE INVADED HYDROCARBON ZONE

(75) Inventors: Jinhong Chen, Katy, TX (US); Jilin Zhang, Cypress, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 1068 days.

(21) Appl. No.: 13/371,770

(22) Filed: Feb. 13, 2012

(65) Prior Publication Data

US 2013/0211725 A1    Aug. 15, 2013

(51) Int. Cl.
     *G01V 3/38*      (2006.01)
     *G01V 3/14*      (2006.01)

(52) U.S. Cl.
     CPC ... *G01V 3/14* (2013.01); *G01V 3/38* (2013.01)

(58) Field of Classification Search
     USPC .......................... 702/11, 12, 13, 85; 324/303
     See application file for complete search history.

(56) References Cited

U.S. PATENT DOCUMENTS

| | | | |
|---|---|---|---|
| 4,424,487 A | 1/1984 | Lauffer | |
| 4,728,892 A | 3/1988 | Vinegar et al. | |
| 6,069,477 A * | 5/2000 | Chen et al. | 324/303 |
| 6,825,658 B2 | 11/2004 | Coates et al. | |
| 6,859,033 B2 | 2/2005 | Speier | |
| 7,196,517 B2 | 3/2007 | Freedman | |
| 2005/0272158 A1 | 12/2005 | Galford et al. | |
| 2007/0075706 A1 | 4/2007 | Chen et al. | |
| 2008/0206887 A1 | 8/2008 | Chen et al. | |
| 2008/0234937 A1 | 9/2008 | Fang et al. | |
| 2009/0179636 A1 * | 7/2009 | Chen | 324/303 |
| 2011/0168879 A1 | 7/2011 | Evans et al. | |

OTHER PUBLICATIONS

International Search Report and Written Opinion for PCT Application No. PCT/US2013/024810, dated May 14, 2013, pp. 1-10.

J. Galford, J. Truax, G. Moake, . SPWLA 46 "A combination of laboratory experiments and Monte Carlo simulations have been used to develop a better understanding of the influences formate muds have on wireline gamma-ray, density, and thermal-neutron porosity logs." SPWLA 46th Annual Logging Symposium held in New Orleans, Louisiana, United States, Jun. 26-29, 2005. pp. 1-16.

(Continued)

*Primary Examiner* — Mohamed Charioui
(74) *Attorney, Agent, or Firm* — Cantor Colburn LLP (57) ABSTRACT

A system and method estimate a property of an earth formation comprising hydrocarbon and non-hydrocarbon components. The method includes conveying a carrier down a borehole penetrating the earth formation, and performing a nuclear magnetic resonance (NMR) measurement on fluid in the earth formation with an NMR instrument disposed at the carrier to provide total NMR measurement data. The method also includes separating the total NMR measurement data into hydrocarbon-resultant NMR measurement data and non-hydrocarbon-resultant NMR measurement data, scaling a portion of the non-hydrocarbon-resultant NMR measurement data based on a correction factor to obtain scaled non-hydrocarbon-resultant NMR measurement data, and estimating the property based on the hydrocarbon-resultant NMR measurement data and the scaled non-hydrocarbon-resultant NMR measurement data.

18 Claims, 4 Drawing Sheets

(56) References Cited

OTHER PUBLICATIONS

J.H. Chen, J Zhang, A.K. Thorsen, M Constable, N.S. Nwaneri, "Method for correcting NMR porosity in formate brine-invaded formations". SPWLA 52 Annual Logging Symposium, May 14-18, 2011 paper SSS. Laboratory study of formate brine on BVI and cutoffs and time required for BVI and BVM mixing. pp. 1-12.

B.K. Pedersen, E.S. Pedersen, S. Morriss, M.V. Constable, B. Vissapragada, A. Sibbit, C. Stoller, J. Almaguer, M. Evans, F. Shray, J. Grau, E. Fordham, C.C. Minh, H. Scott, D. McKeon. "Understanding the Effects of Cesium/Potassium Formate Fluid on Well Log Response—A Case Study of the Kristin and Kvitebjorn Fields, Offshore Norway", SPE 103067, SPE Annual Technical Conference and Exhibition held in San Antonio, Texas, U.S.A. Sep. 24-27, 2006. pp. 1-21.

\* cited by examiner

POROSITY ESTIMATOR FOR FORMATE BRINE INVADED HYDROCARBON ZONE

BACKGROUND

Drilling fluids, referred to as drilling mud, are added to a wellbore to facilitate the drilling process in a variety of ways. Using formate brine (sodium, potassium, and cesium salts of formic acid) as drilling mud is more environmentally friendly and is suitable for high temperature (up to 437° F.) and high pressure (1,100 bar) drilling. However, formate brine presents a challenge for formation evaluation by traditional logging technologies. This is especially true for nuclear tools for which the invasion of formate brine results in significant underestimation of formation porosity. Formate brine has a lower hydrogen index (proton density) compared to water in the same volume. Thus, if the low proportion of proton in formate brine is not accounted for, the porosity estimate will be lower than the actual porosity value. Accordingly, a method and apparatus that corrects the hydrogen index of the total fluid and provides a more accurate total porosity estimate would be appreciated in the drilling industry.

SUMMARY

According to one aspect of the invention, a method of estimating a property of an earth formation comprising hydrocarbon and non-hydrocarbon components includes conveying a carrier through a borehole penetrating the earth formation; performing a nuclear magnetic resonance (NMR) measurement on fluid in the earth formation with an NMR instrument disposed at the carrier to provide total NMR measurement data; separating the total NMR measurement data into hydrocarbon-resultant NMR measurement data and non-hydrocarbon-resultant NMR measurement data; scaling a portion of the non-hydrocarbon-resultant NMR measurement data based on a correction factor to obtain scaled non-hydrocarbon-resultant NMR measurement data; and estimating the property based on the hydrocarbon-resultant NMR measurement data and the scaled non-hydrocarbon-resultant NMR measurement data.

According to another aspect of the invention, a system for estimating a property of an earth formation comprising hydrocarbon and non-hydrocarbon components includes a carrier configured to be conveyed through a borehole penetrating the earth formation; an NMR instrument disposed at the carrier and configured to perform nuclear magnetic resonance (NMR) measurements on fluid in the formation to provide total NMR measurement data; and a processor configured to separate the total NMR measurement data into hydrocarbon-resultant NMR measurement data and non-hydrocarbon-resultant NMR measurement data, scale a portion of the non-hydrocarbon-resultant NMR measurement data based on a correction factor to obtain scaled non-hydrocarbon-resultant NMR measurement data, and estimate the property based on the hydrocarbon-resultant NMR measurement data and the scaled non-hydrocarbon-resultant NMR measurement data.

According to yet another aspect of the invention, a computer-readable medium is configured to store instructions that, when processed by a processor, cause the processor to perform a method of estimating a property of an earth formation comprising hydrocarbon and non-hydrocarbon components. The method includes receiving total NMR measurement data based on fluid in the earth formation from an NMR instrument disposed at a carrier conveyed through a borehole penetrating the earth formation; separating the total NMR measurement data into hydrocarbon-resultant NMR measurement data and non-hydrocarbon-resultant NMR measurement data; scaling a portion of the non-hydrocarbon-resultant NMR measurement data based on a correction factor to obtain scaled non-hydrocarbon-resultant NMR measurement data; and estimating the property based on the hydrocarbon-resultant NMR measurement data and the scaled non-hydrocarbon-resultant NMR measurement data.

BRIEF DESCRIPTION OF THE DRAWINGS

Referring now to the drawings wherein like elements are numbered alike in the several Figures.

DETAILED DESCRIPTION

While one or more embodiments have been shown and described, modifications and substitutions may be made thereto without departing from the spirit and scope of the invention. Accordingly, it is to be understood that the present invention has been described by way of illustrations and not limitation.

Figure 1:
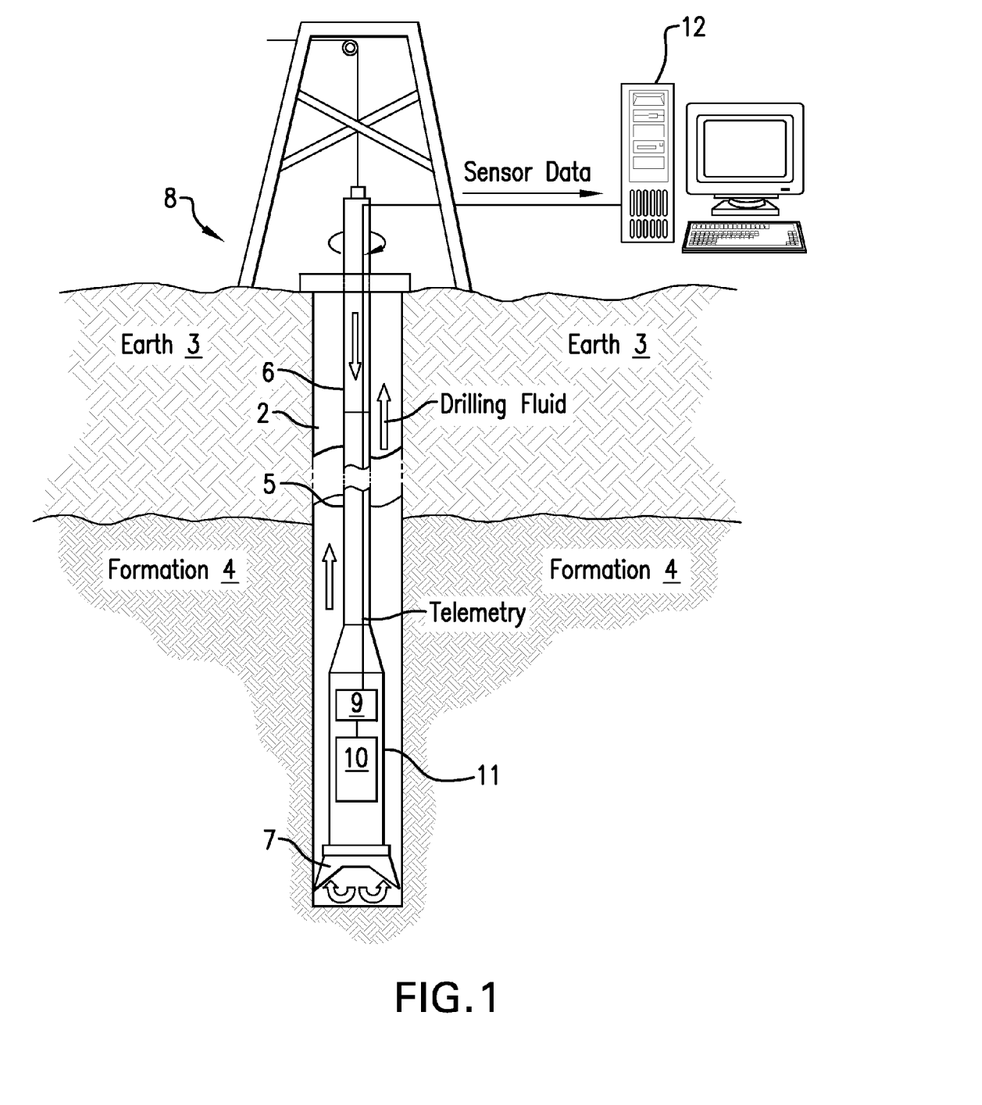
FIG. 1 illustrates a cross-sectional view of an exemplary embodiment of a system to estimate one or more properties of a formation.

FIG. 1 illustrates a cross-sectional view of an exemplary embodiment of a system to estimate one or more properties of a formation. A downhole tool 11 is disposed in a borehole 2 penetrating the earth 3, which includes an earth formation 4. The formation 4 represents any subsurface material of interest. The downhole tool 11 is configured to perform one or more types of measurements and is conveyed through the borehole 2 by a carrier 5. In the embodiment of FIG. 1, the carrier 5 is a drill string 6 in an embodiment known as logging-while-drilling (LWD). In an alternative embodiment, the carrier 5 can be an armored wireline in an embodiment known as wireline logging. Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. The downhole tool 11 includes a nuclear magnetic resonance (NMR) instrument 10 for performing measurements. Downhole electronics 9 may be configured to operate the downhole tool 11, process data obtained by the NMR instrument 10, or provide an interface with telemetry for communicating with a computer processing system 12 disposed at the surface of the earth 3. Operating or processing operations may be performed by the downhole electronics 9, the computer processing system 12, or a combination of the two. Telemetry is configured to convey information or commands between the downhole tool 11 and the computer processing system 12.

The NMR instrument 10 is used to analyze fluids held in pore spaces of the formation 4 because only fluids are "visible" to the NMR instrument 10. In non-limiting embodiments, the NMR instrument 10 includes a permanent magnet that produces a static magnetic field in the formation. The NMR instrument 10 transmits bursts of radio frequency (RF)

energy using a transmitting antenna to generate an oscillating magnetic field and, between transmissions, receives decaying echo signals from the hydrogen protons that process due to the field from the permanent magnet using a receiving antenna. Characteristics of the received echo signals can be correlated to a property of interest of a formation fluid. Because of the linear relationship between the proton resonance frequency and the strength of the permanent magnetic field, the NMR instrument 10 can be tuned to a frequency of interest corresponding to the formation parameters of interest. These parameters can include fluid quantities, fluid properties, and the sizes of pores containing the fluids. When formate brine is used in drilling, it can create an inaccuracy in the NMR estimates of the formation 4 parameters. Because the hydrogen index of formate brine is less than that of water in the same volume, assuming that all the non-hydrocarbons in a formation, such as formate brine, to be water will result in an underestimation of porosity. On the other hand, if the hydrogen index of pure formate brine is used, the result would be an overestimation of the porosity due to the presence of water that is not completely displaced/replaced by formate brine within the formation 4 in the vicinity of borehole 2 during invasion. Because the formate brine is introduced in the drilling process, its hydrogen index is known. Thus, a correct calculation of the total porosity requires a determination of how much formate brine has invaded into the formation.

Figure 2:
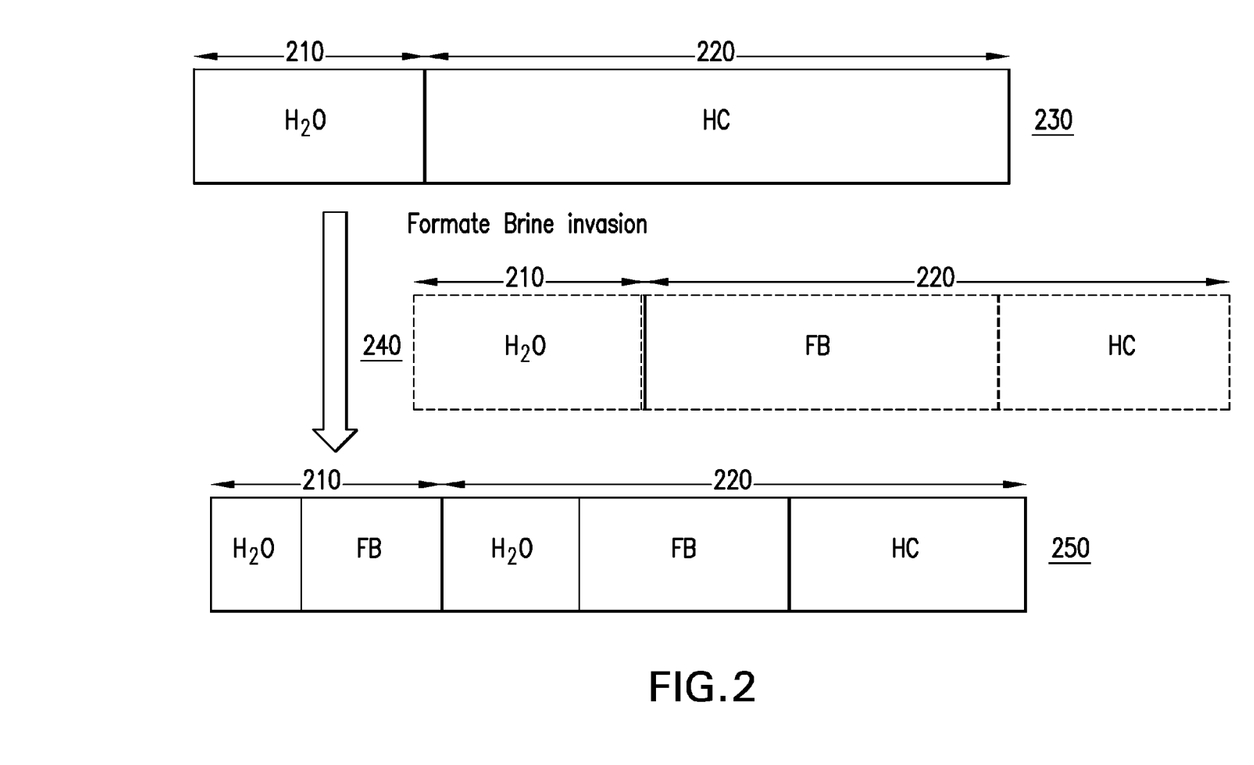
FIG. 2 illustrates the effect of formate brine invasion.

FIG. 2 illustrates the effect of formate brine invasion. The formation pores can be broken down into bulk volume irreducible (BVI) pores 210 and bulk volume movable (BVM) pores 220. Irreducible refers to a volume that is not movable but that is replaceable via diffusion. Total porosity, $\phi$, can be expressed as:

$$\phi = \phi_{BVI} + \phi_{BVM} \quad [EQ\ 1]$$

where $\phi_{BVI}$ is the porosity in the BVI pores, and $\phi_{BVM}$ is the porosity in the BVM pores.

As FIG. 2 shows, the initial formation 4 porosity at 230 (before invasion of formate brine) is divided into BVI pores 210 filled with water and BVM pores 220 filled with oil or gas (hydrocarbons, HC). Invasion of formate brine into the formation 4 pores, as shown at 240, begins with formate brine being introduced into BVM pores 220 to replace part of the hydrocarbons. Then, through a rapid diffusion process based on the fact that formation water and formate brine are easily miscible, the formate brine in the BVM pores 220 and the formation water in the BVI pores 210 mix. As such, the porosity of each region can be expressed as:

$$\phi_{BVI} = \phi^{W}_{BVI} + \phi^{FB}_{BVI} \quad [EQ\ 2]$$

where $\phi^{W}_{BVI}$ is the porosity of water in the BVI pores, and $\phi^{FB}_{BV}$ is the porosity of formate brine in the BVI pores; and $$\phi_{BVM} = \phi^{W}_{BVM} + \phi^{FB}_{BVM} + \phi^{HC} \quad [EQ3]$$

where $\phi^{W}_{BVM}$ is the porosity of water in the BVM pores, $\phi^{FB}_{BVM}$ is the porosity of formate brine in the BVM pores, and $\phi^{HC}$ is the porosity of hydrocarbons, which are only present in the BVM pores.

Further, the volume of water displaced by formate brine in the BVI pores 210 is equal to the volume of formate brine displaced by formation water in the BVM pores 220, and dynamic equilibrium is reached as shown at 250. Thus:

$$\phi^{W}_{BVI}/\phi^{FB}_{BVI} = \phi^{W}_{BVM}/\phi^{FB}_{BVM} \quad [EQ\ 4]$$

and $$\phi^{FB}_{BVI} = \phi^{W}_{BVM} \quad [EQ\ 5]$$

The exemplary proportions of water, formate brine, and hydrocarbons in dynamic equilibrium at 250 illustrate that, if the lower hydrogen index of formate brine is not taken into account and used to correct an estimate of total porosity obtained through an NMR measurement, which is effected by the hydrogen index, then an inaccurate total porosity value will be obtained. That correction is detailed below.

Figure 3:
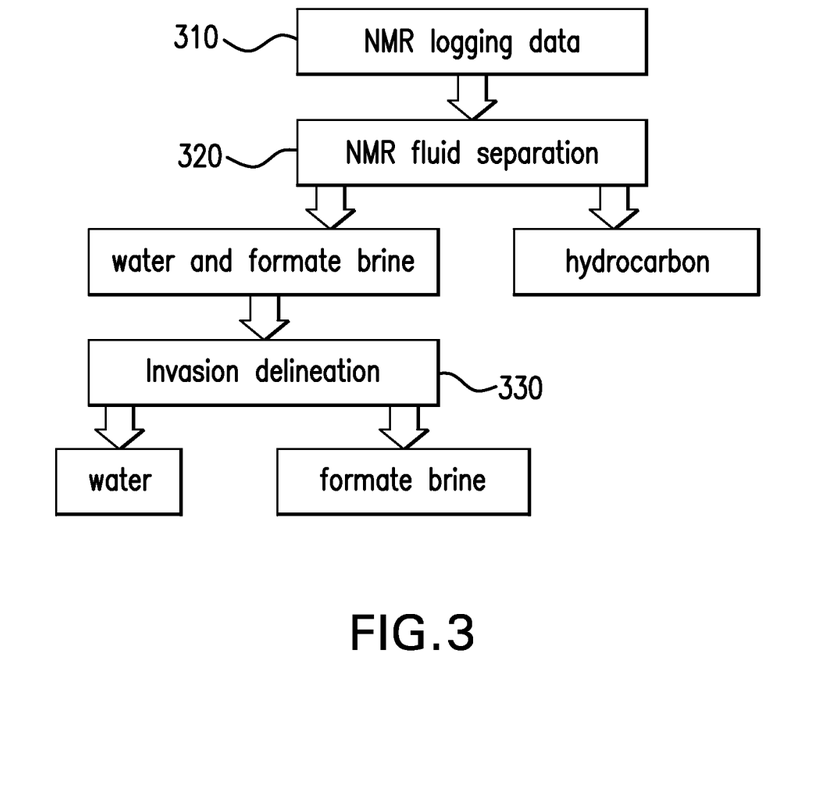
FIG. 3 illustrates aspects of a process for estimating total porosity according to an embodiment of the invention.

FIG. 3 illustrates aspects of a process for estimating total porosity according to an embodiment of the invention. At 310, NMR logging is done by the NMR instrument 10. The logged data is the summation of measurements on all the fluid in the formation including the formation water, formate brine, and hydrocarbons. At 320, known techniques can be used for NMR fluid separation. These known techniques include two-dimensional NMR (2-D NMR) mapping techniques like D-T2 (diffusion-relaxation) and R(T1/T2)-T2 technologies, which are based on the notions that the transverse relaxation of protons is controlled by a bulk relaxation term, a surface relaxation term, and a diffusivity term, and that there are relatively large difference between the diffusivity term between water and hydrocarbons The important aspect of the techniques for the purposes of determining porosity is that, because the bulk NMR property of formate brine is not significantly different from that of water, traditional NMR technology used to separate hydrocarbon NMR data from water NMR data can be used to separate hydrocarbon (hydrocarbon-resultant NMR measurement) from non-hydrocarbon, both water and formate brine (non-hydrocarbon-resultant NMR measurement).

Then a second separation is needed to distinguish the non-hydrocarbon-resultant NMR measurements obtained due to water and formate brine in the BVI pores versus the BVM pores. This separation is based on the size difference between BVI and BVM pores. When the type of the formation is known, the BVI pore NMR measurements can be distinguished from the BVM pore NMR measurements based on a corresponding cutoff value of $T_2$, the transverse relaxation exponential decay time constant associated with the NMR measurement. For example, if the formation rock is sandstone, the cutoff $T_2$ is 33 ms. Thus, NMR measurements associated with $T_2 < 33$ ms relate to BVI pore fluid, and NMR measurements associated with $T_2 > 33$ ms relate to BVM pore fluid. As another example, if the formation rock is carbonate, the cutoff T2 is 92 ms. Thus, NMR measurements associated with $T_2 < 92$ ms relate to BVI pore fluid, and NMR measurements associated with $T_2 > 92$ ms relate to BVM pore fluid. Once both separations are completed, the water and formate brine portion of the received NMR signal S (having the same units as porosity) can be expressed as:

$$S_{BVI} = \phi^{W}_{BVI} + HI^{FB} * \phi^{FB}_{BVI} \quad [EQ6]$$

where $S_{BVI}$ is the portion of the the NMR logging signal obtained using the above-described cutoff value and is presumably the response from fluids in the BVI pores, and $HI^{FB}$ is the known hydrogen index of the formate brine; and $$S^{W+FB}_{BVM} = \phi^{W}_{BVM} + HI^{FB} * \phi^{FB}_{BVM} \quad [EQ7]$$

where $S^{W+FB}_{BVM}$ is the portion of NMR logging signal obtained using the above-described cutoff value after stripping of the hydrocarbon signals using the known 2-D NMR methods, and is presumably the NMR response due to water and the formate brine in the BVM pores As EQ6 and EQ7 illustrate, the hydrogen index of formate brine ($HI^{FB}$) is used as a correction factor and is used to scale the portion of the porosity of non-hydrocarbons associated with the formate brine. This scaling mitigates the overestimation or underestimation that can occur due to the previously discussed lower hydrogen index of formate brine compared to that of water.

By first solving for the porosity of formate brine using the equations above, total porosity can be determined as follows:

$$\phi^W_{BVI} = (S^2_{BVI})/(HI^{FB} * S^{W+FB}_{BVM} + S_{BVI}) \quad [EQ\ 8]$$

$$\phi^{FB}_{BVI} = \phi^W_{BVM} = (S_{BVI} * S^{W+FB}_{BVM})/(HI^{FB} * S^{W+FB}_{BVM} + S_{BVI}) \quad [EQ\ 9]$$

$$\phi^{FB}_{BVM} = ((S^{W+FB}_{BVM})^2)/(HI^{FB} * S^{W+FB}_{BVM} + S_{BVI}) \quad [EQ\ 10]$$

such that total porosity of invaded formate brine is given by the sum of [EQ 9] and [EQ 10] above. That is, the total porosity of invaded formate brine is the porosity of invaded formate brine in the BVI pores added to the porosity of invaded formate brine in the BVM pores:

$$\phi^{FB} = [(S_{BVI} * S^{W+FB}_{BVM}) + ((S^{W+FB}_{BVM})^2)]/(HI^{FB} * S^{W+FB}_{BVM} + S_{BVI}) \quad [EQ\ 11]$$

Then the total porosity is given by functions of NMR signal components in BVI and BVM pores, the determined porosity of hydrocarbon through separation of the NMR signal, and the known hydrogen index of the formate brine in the following manner:

$$\phi = \phi^{HC} + [(S_{BVI} + S^{W+FB}_{BVM})^2]/(HI^{FB} * S^{W+FB}_{BVM} + S_{BVI}) \quad [EQ\ 12]$$

Porosity is the fraction of voids in a volume of formation rock, but, because the formation 4 voids (filled with hydrocarbon, water, or formate brine) are of actual interest and reflect the volume of formation 4 fluid, the terms porosity and volume are used interchangeably. That is, [EQ 12] can be used to provide the total volume of formation 4 fluid.

Figure 4:
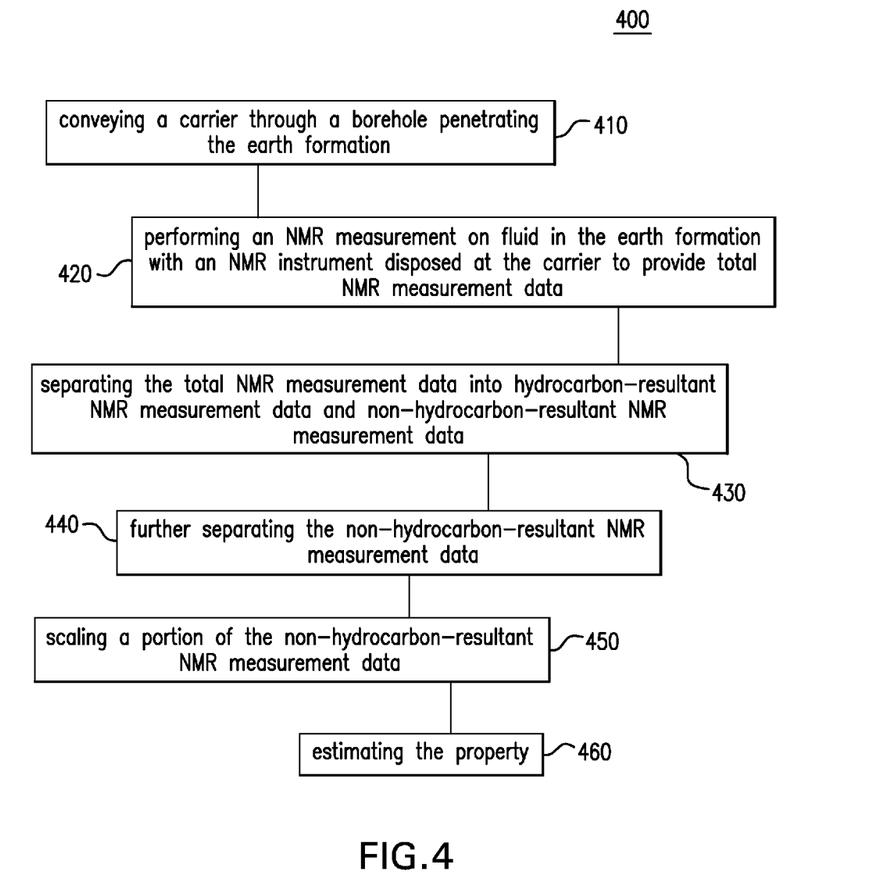
FIG. 4 depicts the processes included in estimating a formation property of an earth formation comprising hydrocarbon and non-hydrocarbon components according to an embodiment of the invention.

FIG. 4 depicts the processes 400 included in estimating a formation 4 property of an earth formation 4 comprising hydrocarbon and non-hydrocarbon components according to an embodiment of the invention. The processes include conveying a carrier through a borehole penetrating the earth formation at block 410. At 420, the process includes performing an NMR measurement on fluid in the earth formation 4 with an NMR instrument 10 disposed at the carrier to provide total NMR measurement data. At 430, the process includes separating the total NMR measurement data into hydrocarbon-resultant NMR measurement data and non-hydrocarbon-resultant NMR measurement data. This separation may be done with known techniques such as 2D D-T2 (diffusion-relaxation) and R(T1/T2)-T2 technologies. At block 440, the process includes further separating the non-hydrocarbon-resultant NMR measurement data. This further separating is based on two or more pore types of the earth formation 4. The pore types include bulk volume irreducible (BVI) pores and bulk volume movable (BVM) pores. The separation is based on knowing the type of rock in the formation 4 such that a cutoff T2 (the transverse relaxation exponential decay time constant) corresponding to that type of rock is used to distinguish the NMR measurement data resulting from BVI pores from that resulting from BVM pores. At block 450, the process includes scaling a portion of the non-hydrocarbon-resultant NMR measurement data. This portion is associated with the formate brine, and the scaling involves the hydrogen index of the formate brine as a correction factor to scale the portion of the non-hydrocarbon-resultant NMR measurement data associated with the formate brine. At 460, the process includes estimating the property and is based on the separated NMR measurement data. Specifically, when the property is total porosity, EQ 12 is used to estimate the total porosity based on the obtained NMR measurement data.

In support of the teachings herein, various analysis components may be used, including a digital and/or an analog system. For example, the downhole electronics 9 or the computer processing system 12 may include the digital and/or analog system. Each system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of estimating a property of an earth formation comprising hydrocarbon and non-hydrocarbon components, the method comprising:
conveying a carrier through a borehole penetrating the earth formation;
performing a nuclear magnetic resonance (NMR) measurement on fluid in the earth formation with an NMR instrument disposed at the carrier to provide total NMR measurement data that includes a combination of hydrocarbon-resultant NMR measurement data and non-hydrocarbon-resultant NMR measurement data;
separating the total NMR measurement data into the hydrocarbon-resultant NMR measurement data and the non-hydrocarbon-resultant NMR measurement data;
scaling a portion of the non-hydrocarbon-resultant NMR measurement data based on a correction factor to obtain scaled non-hydrocarbon-resultant NMR measurement data; and
estimating the property based on the hydrocarbon-resultant NMR measurement data and the scaled non-hydrocarbon-resultant NMR measurement data.

2. The method according to claim 1, wherein the separating includes obtaining the non-hydrocarbon-resultant NMR measurement data resulting from water and formate brine.

3. The method according to claim 2, wherein the portion of the non-hydrocarbon-resultant NMR measurement data results from the formate brine.

4. The method according to claim 3, wherein the correction factor is a hydrogen index of the formate brine.

5. The method according to claim 2, further comprising:
further separating the non-hydrocarbon-resultant NMR measurement data based on two or more pore types of the earth formation.

6. The method according to claim 5, wherein the further separating includes determining a type of rock comprised by the earth formation.

7. The method according to claim 5, wherein the further separating includes obtaining non-hydrocarbon-resultant NMR measurement data in bulk volume irreducible (BVI) pores and bulk volume movable (BVM) pores.

8. The method according to claim 7, wherein the property is total porosity, and the estimating includes solving the following equation:

$$\phi = \phi^{HC} + [(S_{BVI} + S^{W+FB}_{BVM})\hat{\ }2]/(HI^{FB} * S^{W+FB}_{BVM} + S_{BVI}), \text{ where}$$

$\phi$=total porosity,
$\phi^{HC}$=porosity of hydrocarbon,
$S_{BVI}$=NMR measurement data resulting from BVI pores,
$S^{W+FB}_{BVM}$=NMR measurement data resulting from the water and formate brine in BVM pores, and
$HI^{FB}$=hydrogen index of formate brine.

9. A system for estimating a property of an earth formation comprising hydrocarbon and non-hydrocarbon components, the system comprising:
a carrier configured to be conveyed through a borehole penetrating the earth formation;
an NMR instrument disposed at the carrier and configured to perform nuclear magnetic resonance (NMR) measurements on fluid in the formation to provide total NMR measurement data that includes a combination of hydrocarbon-resultant NMR measurement data and non-hydrocarbon-resultant NMR measurement data; and
a processor configured to separate the total NMR measurement data into the hydrocarbon-resultant NMR measurement data and the non-hydrocarbon-resultant NMR measurement data, scale a portion of the non-hydrocarbon-resultant NMR measurement data based on a correction factor to obtain scaled non-hydrocarbon-resultant NMR measurement data, and estimate the property based on the hydrocarbon-resultant NMR measurement data and the scaled non-hydrocarbon-resultant NMR measurement data.

10. The system according to claim 9, wherein the processor obtains non-hydrocarbon-resultant NMR measurement data resulting from water and formate brine.

11. The system according to claim 10, wherein the portion of the non-hydrocarbon-resultant NMR measurement data results from the formate brine.

12. The system according to claim 11, wherein the correction factor is a hydrogen index of the formate brine.

13. The system according to claim 10, wherein the processor further separates the non-hydrocarbon-resultant NMR measurement data based on two or more pore types of the earth formation.

14. The system according to claim 13, wherein the processor determines a type of rock comprised by the earth formation to further separate the non-hydrocarbon-resultant NMR measurement data based on the two or more pore types of the earth formation.

15. The system according to claim 13, wherein the processor obtains non-hydrocarbon-resultant NMR measurement data in bulk volume irreducible (BVI) pores and bulk volume movable (BVM) pores.

16. The system according to claim 15, wherein the property is total porosity, and the processor estimates the property by solving the following equation:

$$\phi = \phi^{HC} + [(S_{BVI} + S^{W+FB}_{BVM})\hat{\ }2]/(HI^{FB} * S^{W+FB}_{BVM} + S_{BVI}), \text{ where}$$

$\phi$=total porosity,
$\phi^{HC}$=porosity of hydrocarbon,
$S_{BVI}$=NMR measurement data resulting from BVI pores,
$S^{W+FB}_{BVM}$=NMR measurement data resulting from the water and formate brine in BVM pores, and
$HI^{FB}$=hydrogen index of formate brine.

17. A non-transitory computer-readable medium configured to store instructions that, when processed by a processor, cause the processor to perform a method of estimating a property of an earth formation comprising hydrocarbon and non-hydrocarbon components, the method comprising:
receiving total NMR measurement data based on fluid in the earth formation from an NMR instrument disposed at a carrier conveyed through a borehole penetrating the earth formation, the total NMR measurement data including a combination of hydrocarbon-resultant NMR measurement data and non-hydrocarbon-resultant NMR measurement data;
separating the total NMR measurement data into the hydrocarbon-resultant NMR measurement data and the non-hydrocarbon-resultant NMR measurement data;
scaling a portion of the non-hydrocarbon-resultant NMR measurement data based on a correction factor to obtain scaled non-hydrocarbon-resultant NMR measurement data; and
estimating the property based on the hydrocarbon-resultant NMR measurement data and the scaled non-hydrocarbon-resultant NMR measurement data.

18. The non-transitory computer readable medium according to claim 17, wherein the non-hydrocarbon components include water and formate brine, the correction factor is a hydrogen index of formate brine, the property is total porosity, and the estimating includes solving the following equation:

$$\phi = \phi^{HC} + [(S_{BVI} + S^{W+FB}_{BVM})^2]/(HI^{FB} * S^{W+FB}_{BVM} + S_{BVI}), \text{ where}$$

$\phi$ = total porosity,
$\phi^{HC}$ = porosity of hydrocarbon,
$S_{BVI}$ = NMR measurement data resulting from BVI pores,
$S^{W+FB}_{BVM}$ = NMR measurement data resulting from non-hydrocarbons (water and formate brine) in BVM pores, and
$HI^{FB}$ = the hydrogen index of formate brine.

* * * * *